US008462020B1

(12) United States Patent
Vanhoozer et al.

(10) Patent No.: US 8,462,020 B1
(45) Date of Patent: Jun. 11, 2013

(54) ATTITUDE AND CONFIGURATION INDICATOR DISPLAY SYSTEM AND METHOD

(76) Inventors: Russell Alan Vanhoozer, Waco, TX (US); Bradley G. Wilburn, Fort Worth, TX (US)

( * ) Notice: Subject to any disclaimer, the term of this patent is extended or adjusted under 35 U.S.C. 154(b) by 300 days.

(21) Appl. No.: 12/661,784

(22) Filed: Mar. 24, 2010

(51) Int. Cl.
*G01C 23/00* (2006.01)
*G06G 7/48* (2006.01)

(52) U.S. Cl.
USPC .............................................. 340/975; 703/8

(58) Field of Classification Search
USPC .................... 340/973, 974; 703/8; 434/43
See application file for complete search history.

(56) References Cited

U.S. PATENT DOCUMENTS

| 5,357,263 | A | * | 10/1994 | Fischer et al. | 345/9 |
| 6,931,368 | B1 | * | 8/2005 | Seifert | 703/8 |
| 2002/0099528 | A1 | * | 7/2002 | Hett | 703/13 |
| 2005/0012642 | A1 | * | 1/2005 | Sacle | 340/973 |
| 2009/0315739 | A1 | * | 12/2009 | Raje | 340/979 |
| 2010/0066566 | A1 | * | 3/2010 | Reusser et al. | 340/971 |
| 2011/0205090 | A1 | * | 8/2011 | Marstall et al. | 340/975 |

* cited by examiner

*Primary Examiner* — Benjamin C Lee
*Assistant Examiner* — Sigmund Tang
(74) *Attorney, Agent, or Firm* — Jeffrey Roddy

(57) ABSTRACT

Attitude and Configuration Indicator Display System and Method within the context of an Electronic Instrument System in which the configuration status of a piloted craft; typically the instant positions of lift inducing elements and drag inducing elements, are represented by symbol groupings integrated with an a parent icon, typically a chevron-type symbol representative of the piloted craft. The symbol groupings receive data from associated on-board sensors and are displayed singly or in combination with each other anytime the piloted craft is not in a clean configuration to instantly alert the pilot(s) of the configuration status with a single glance directed to the attitude indicator.

8 Claims, 5 Drawing Sheets

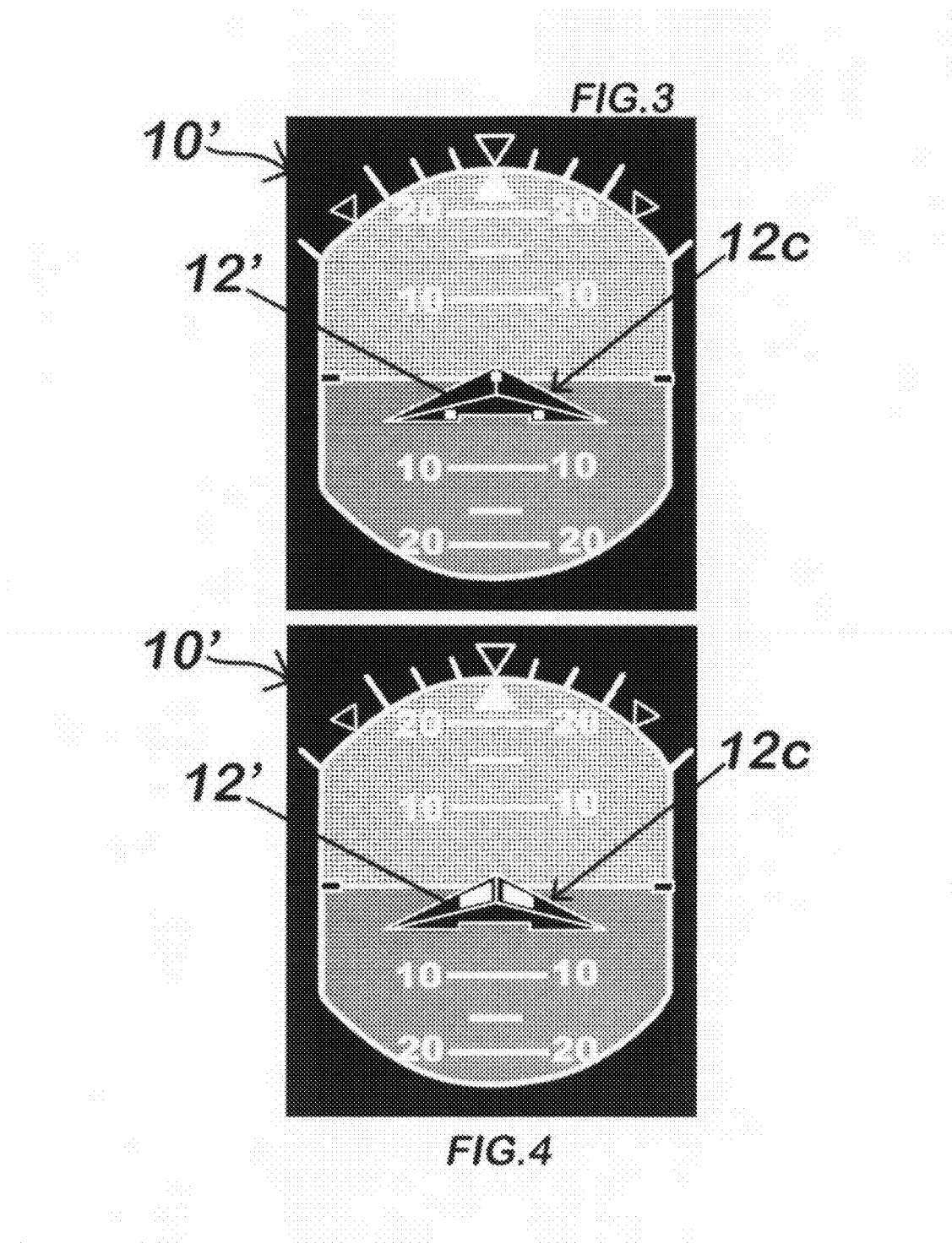

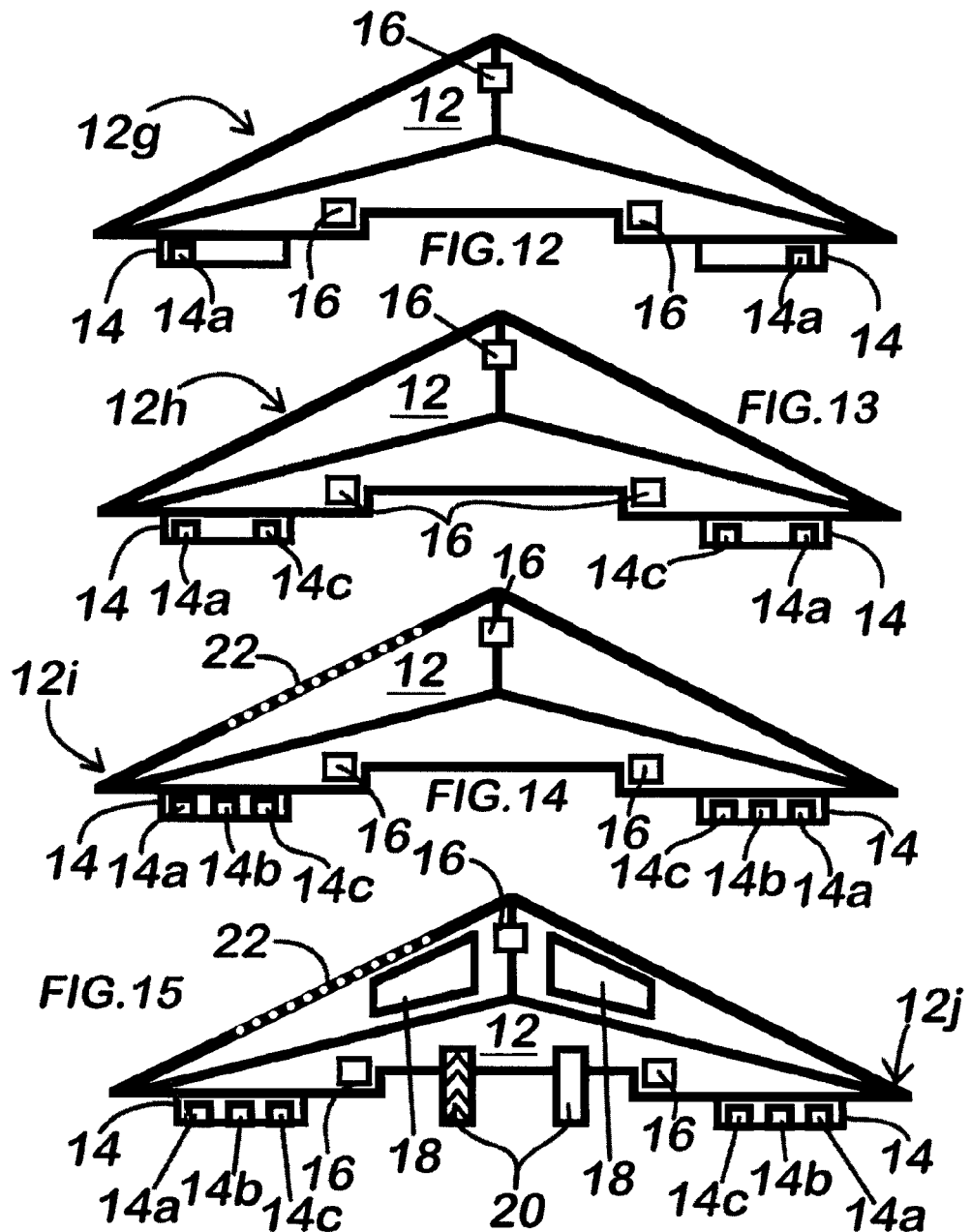

ATTITUDE AND CONFIGURATION INDICATOR DISPLAY SYSTEM AND METHOD

CROSS REFERENCE TO RELATED APPLICATIONS

Not Applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

FIELD OF THE INVENTION

The invention relates generally to electronic instrument display systems and specifically to the display of configuration settings of a piloted craft within an attitude indicator; the piloted craft, including but not limited to, fixed wing aircraft, rotor-wing aircraft, spacecraft, lighter than air aircraft, and watercraft such as ships, barges, boats, semi-submersibles and fully submersible craft.

BACKGROUND OF THE INVENTION

Various advances electronic instrument display systems and in particular Electronic Flight Information Systems (EFIS), have been implemented to make the difficult task of interpreting the operational status of commercial aircraft easier for pilots. Generally flight display systems include a primary flight display (PFD) installed in front of the left seat pilot position and a multi-function display (MFD) positioned centrally relative to the instrument panel. While the layout of the PFD may vary considerably depending on the manufacturer and the default or preferred settings which alter the arrangement of the various instruments displayed, the PFD typically includes a centrally positioned attitude indicator, airspeed indicator, altitude indicators, a vertical speed indicator next to the altitude indicator, and a heading display showing the magnetic heading of the aircraft. The attitude indicator is the most relied on by the pilot especially in low visibility conditions, or instrument flying and reflects the pitch (fore and aft tilt) and the roll (side to side tilt) of the aircraft. While modern attitude indicators typically have a chevron symbol representing the aircraft in relationship to an artificial horizon line in which the upward point of the chevron represents the nose of the aircraft, other various shapes representing the aircraft are also used.

According to the NTSB, between 1997 and 2006, 22.6% of all aircraft accidents occurred during takeoff and 35.4% while landing; both situations in which the aircraft is substantially more exposed to engine problems or weather problems such as wind shear, than at most other times in the flight. As recognized by those skilled in the art, lift induced drag and ground effects appear to be contributing factors in many of these accidents.

Specific lift inducing and drag inducing elements are employed during takeoff and landing which together comprise what is known to those skilled in the art as the configuration. The configuration elements of a modern aircraft can include the flaps which are hinged surfaces on the trailing edge of the fixed wings that are deployed to reduce the stalling speed, the slats which are positioned at the leading edge of the fixed wings and when deployed allow the wing to operate at a higher angle of attack, the landing gear, the spoilers which are plates on the top surface of the wings which are extended upward into the airflow to reduce lift, and the reverse thrusters which temporarily redirect a jet engine's exhaust forward to decelerate the aircraft on landing.

The misapprehension of the configuration status, and in particular the position of the spoilers figures in a number of recent accidents. While on most modern transport craft ground spoilers extend automatically upon touchdown, any failure to deploy spoilers in a timely fashion may result in accidents.

On Jun. 1, 1999 American Airlines Flight 1420 overran the runway at Little Rock National Airport. The NTSB investigation found that the pilots failed to arm the automatic ground spoiler system.

On Jul. 17, 2007 TAM Airlines Flight 3054 crashed upon landing at the Congonhas-Sao Paulo International Airport, São Paulo, Brazil. It was revealed that the spoilers had not deployed and that only one engine had deployed its thrust reverser causing the aircraft to careen off the run way.

In some cases, failure to deactivate the spoilers when accelerating has caused accidents. For example, failure to deactivate the spoilers while climbing to avoid a mountain contributed to the crash of American Airlines Flight 965 on Dec. 20, 1995.

Due to the criticality of understanding a piloted craft's instant configuration, what is needed is a display system that integrates symbols representative of the piloted craft's configuration elements immediately within the bounds of an attitude indicator, and specifically within the borders of—or proximate to—the symbol for a piloted craft which is centrally displayed within the attitude indicator so a pilot may obtain the current configuration of the piloted craft from the single most relied on indicator.

SUMMARY OF THE INVENTION

The present invention is most generally, an Attitude and Configuration Indicator Display System and Method as part of an Electronic Instrument Display that includes graphical symbol groups representative of the piloted craft's configuration, i.e., including but not limited to the instant positional status of the lift inducing and drag inducing elements. In commercial aircraft, the elements typically comprising the configuration are considered the flaps, the slats, the landing gear, and the spoilers. Configuration should be understood to embody information regarding the deployment, non-deployment, and functioning of these elements either singly or collectively. More specifically, dedicated sensors associated with each configuration element provide the information via a computerized control system in which the symbol groups representative of the configuration elements are integrally displayed within, or proximate to an aircraft reference symbol, which for exemplary purposes only is depicted herein as a chevron symbol occupying the central position within an attitude indicator display. Even more specifically, the configuration elements are represented as symbol groups and are differentiated from one another by at least position, shape, behavior, and furthermore, move in concert with the aircraft reference symbol. The present invention makes it possible for the pilot(s) to view and readily apprehend the aircraft's configuration at a single glance directed to the attitude indicator.

One object of the present invention is to provide a means to quickly apprehend the configuration status of a piloted craft.

Another object of the present invention is to help prevent accidents caused by the misapprehension of a piloted craft's configuration during all phases of flight including take-off and landing.

Yet another object of the present invention is to reduce the number of displays required to apprehend the configuration settings of an aircraft.

A further object of the present invention is to help reduce mental fatigue due to the concentration required to monitor multiple flight indicators especially in stressful situations.

While examples discussed herein are directed generally to a fixed wing aircraft, as would be appreciated by those skilled in the art having the benefit of this disclosure, configuration elements; i.e., drag inducing and lift inducing elements, are present in a variety of piloted craft as for example, the bow planes of a submarine, and thus the description that follows is not intended to limit the scope of the invention to the particular forms set forth, but on the contrary, it is intended to cover such alternatives, modifications, combinations and equivalents as may be included within the spirit and scope of the invention as set forth in the detailed description.

BRIEF DESCRIPTION OF THE DRAWINGS

FIG. 3 is a plan view of an enhanced attitude indicator according to the present invention in which the piloted craft has landing gear down;

FIG. 4 is a plan view of an enhanced attitude indicator according to the present invention in which the piloted craft has spoilers deployed;

FIG. 12 is a detail view of a configuration 12g representative of a piloted craft transitioning to landing configuration; the flap indicators 14 are shown proximate to the borders of the parent icon; the flaps being positioned at 9 degrees as indicated by showing sub-indicators 14a only;

FIG. 13 is a detail view of an alternate embodiment according to the present invention in which the configuration 12h is representative of a piloted craft transitioning to landing configuration shown with the flaps positioned at 22 degrees as indicated by showing sub-indicators 14a with sub-indicators and 14c which are shown inside flap symbol group 14;

FIG. 14 is a detail view of the embodiment shown in FIG. 12 according to the present invention shown in landing configuration 12i with the flaps are fully deployed at 45 degrees, the landing gear is down; and, depicted with the left wing slat malfunctioning;

FIG. 15 is a detail view of the embodiment shown in FIG. 12 according to the present invention shown in full configuration 12j with the spoilers in deployed position, flaps down, landing gear down and, further, depicted with the left wing slat 22 malfunctioning and a malfunction of the left reverse thruster as indicated by the force lines within (left) symbol 20;

DETAILED DESCRIPTION OF THE INVENTION

Figure 1:
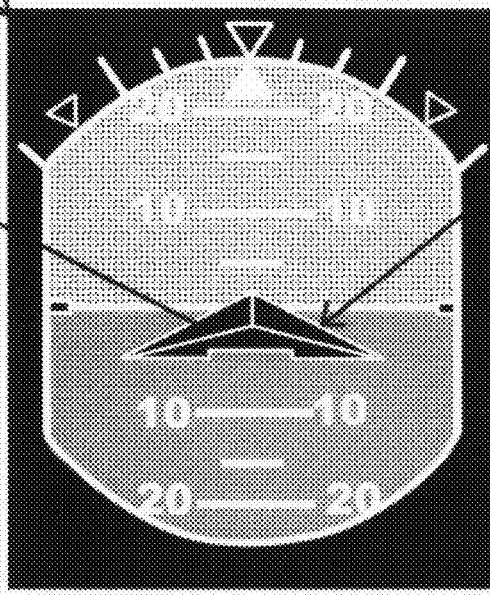
FIG. 1 is a plan view of an enhanced attitude indicator according to the present invention in which the piloted craft is in clean configuration.
Figure 2:
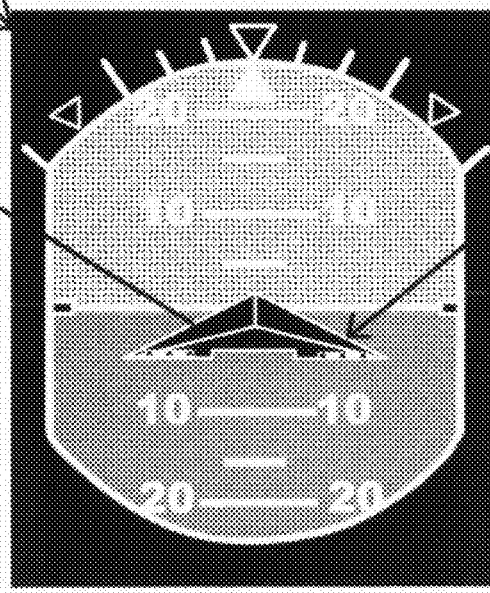
FIG. 2 is a plan view of an enhanced attitude indicator according to the present invention in which the piloted craft has flaps down at 45 degree position.
Figure 5:
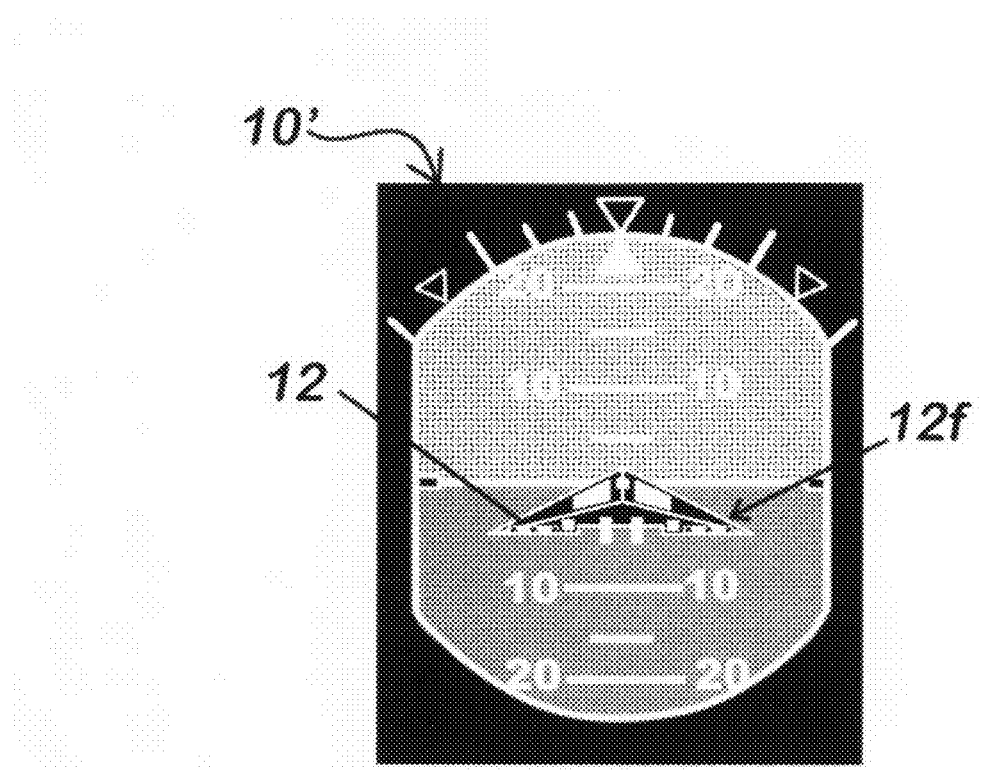
FIG. 5 is a plan view of an enhanced attitude indicator according to the present invention in which the piloted craft is in full configuration.
Figure 6:
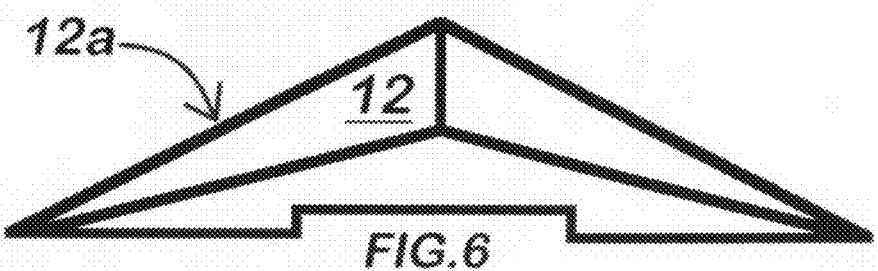
FIG. 6 is a detail view of a configuration 12a representative of a piloted craft in clean configuration.

Reference listing:
10' enhanced attitude indicator
12 aircraft reference symbol
14 flap symbols
14a flap position indicator
14b flap position indicator
14c flap position indicator
16 landing gear symbols
18 spoiler symbols
20 reverse thruster symbol
22 slat symbols Referring generally to FIGS. 1-15; an embodiment according to the present invention includes an attitude indicator 10', and a parent icon 12 shown here typically as a chevron which represents a piloted craft. The particular shape of the parent icon presented herein is merely exemplary and should be considered non-limiting. It should also be understood that while there are many variants of attitude indicators of different design possessing an icon different from the chevron shape depicted and having shapes, colors, borders and proportions that vary, all possess a central icon that at a minimum depicts the wings and nose of the aircraft in relationship to an artificial horizon, if only the wings are represented by two lines and the nose by a point. Reference numbers 12a, 12b, 12c, 12d, 12e, 12f, 12g, 12h, 12i and 12j represent various configurations of a piloted craft in which the parent icon and the child symbol groups 14, 16, 18, 20 and 22 graphically represent the instant configuration status of a piloted craft. The display status of the flaps 14, slats 22, landing gear 16, spoilers 18 and reverse thrusters 20 taken together represent the overall configuration of a piloted craft at any given time. The flaps, landing gear, reverse thrusters and spoiler groups belong to parent 12. The flap group, landing gear group, slats group, thrusters group and spoilers group each include a collection of sub-indicators that belong to their respective groups. FIG. 1 shows a piloted craft in "clean" configuration in which the landing gear group 16, flaps group 14, spoiler group 18 and reverse thrusters group 20 are not displayed because they are not deployed in a clean configuration. In FIG. 2 only the flaps 14 are displayed indicating that only the flaps are deployed. In the examples depicted, there are two flap symbol groups 14, one group each for the port and starboard wings; with each flap group having three sub-indicators that show the positional status of the flaps for the particular wing. In FIG. 3 only the symbol group for the landing gear 16 is displayed indicating that only the landing gear is deployed. In FIG. 4 only the spoilers 18 are shown deployed and in FIG. 5 the piloted craft is shown in what is generally understood as full configuration status with gear 16 down, flaps 14 down, reverse thrusters 20 deployed and spoilers 18 deployed.

Unless otherwise specified, it should be understood that the groupings displayed are merely for purposes of illustration and do not necessarily indicate of the specific groupings one would encounter in practice. For example, it is unlikely that there would be a case of landing gear deployment exclusive of other elements associated with the aircraft's configuration.

Figure 7:
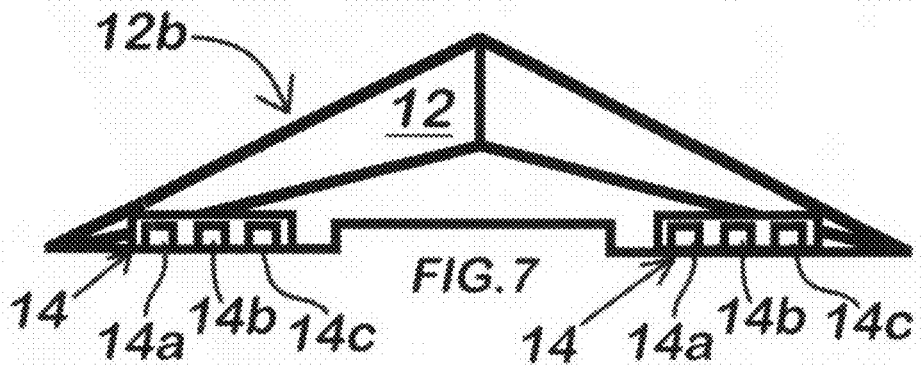
FIG. 7 is a detail view of a configuration 12b representative of a piloted craft showing the flaps deployed in 45 degree position.
Figure 8:
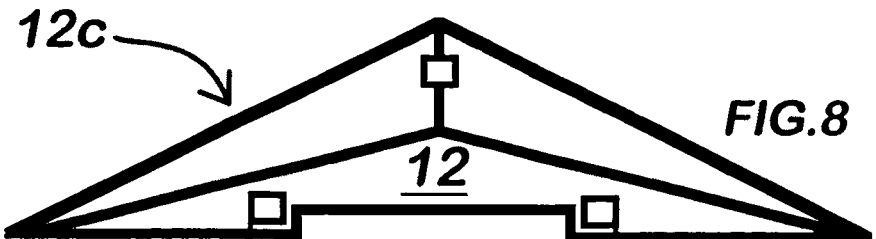
FIG. 8 is a detail view of a configuration 12c representative of a piloted craft showing the only the landing gear in down position.
Figure 9:
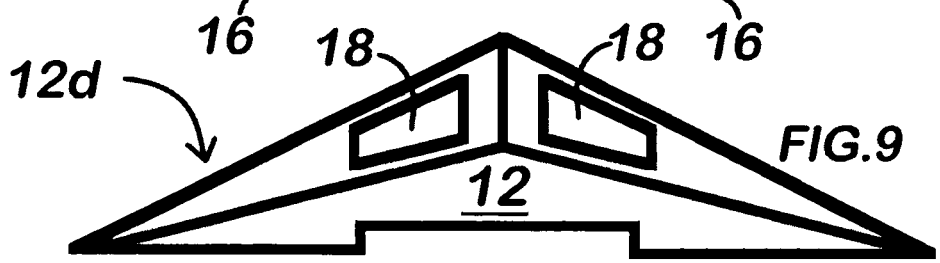
FIG. 9 is a detail view of a configuration 12d representative of a piloted craft showing the only the spoilers in deployed position.
Figure 10:
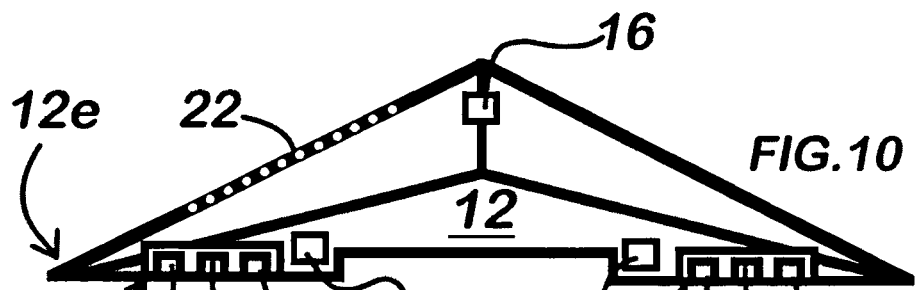
FIG. 10 is a detail view of a landing configuration 12e representative of a piloted craft showing the landing gear deployed, the flaps in the 45 degree position and an indicator representing a malfunctioning slat 22 on the leading edge of the left wing.
Figure 11:
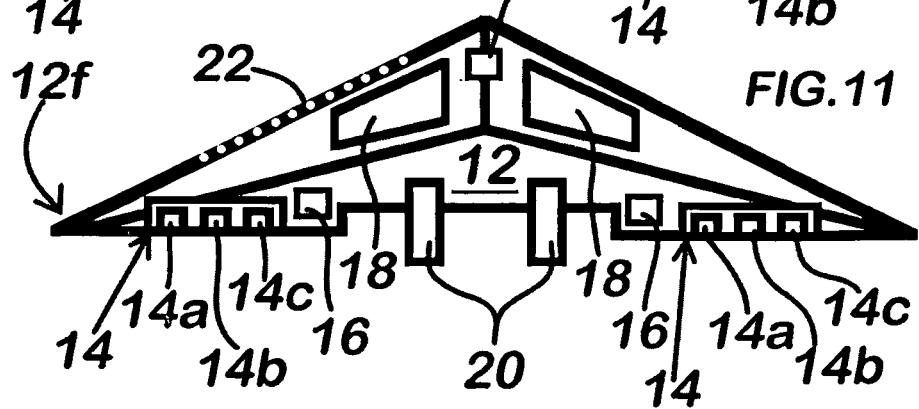
FIG. 11 is a detail view of a configuration 12f representative of a piloted craft in full configuration with flaps 14 down at 45 degrees as indicated by showing sub-indicators 14a, 14b and 14c, and spoilers 18 deployed, landing gear 16 down, reverse thrusters 20 deployed, and like FIG. 10, depicts a malfunctioning slat 22 on the leading edge of the left wing.

FIGS. 6-15 are specific detail views of the parent icon possessing the child groups. Within each child grouping is a subgroup of individual indicators or sub-indicators representing a single element associated with a piloted craft's configuration such as the nose landing gear, or a particular starboard wing spoiler. See for example, the flap symbol groups 14 which each contain three separate sub-indictors that indicate the instant position of the flaps. It should be appreciated that the number of flaps per wing and degree setting may vary by manufacturer, and therefore, the particular embodiment shown is again merely exemplary, and is considered to be non-limiting. In FIG. 7 the flaps 14 are shown inside the borders of the parent icon, while in another aspect according to the present invention shown in FIGS. 12-15, the flaps are proximate to and outside the borders of parent icon 12. Specifically referring to FIG. 10 and FIG. 11, a slat malfunction is shown by indicator 22 which is positioned on the leading edge of each wing. Typically, indicator 22 only displays if there is a malfunction of the leading edge slats, and then only on that portion of the parent icon's borders associated with the leading edge of the piloted craft's wings.

The child groupings are differentiated from one another by at least size, shape and position relative to the parent icon 12' and each other. Preferentially, the child groupings do not overlap and may be displayed singly, in multiple groups or collectively as in a full configuration. Moreover, within a single group any number of individual members or sub-indicators may display at any given time depending on the configuration settings as when a spoiler is deployed on only one wing to aid in roll control. In all cases, the child groups move in concert with the parent icon and the sub-indicators move in concert with the respective child group, and all child groups are positioned either immediately proximate to, or within the boundaries of the parent icon.

The sub-indicators as members of the child group may behave differently from each other by pulsing at different rates, and can be distinguished by color or intensity depending on operational status.

Where aircraft is the piloted craft, the behavior of the child groupings and individual indicators thereof are mediated by the flight control system which includes the electronics and computer systems to aid in flight and accesses real time metrics from flight sensors associated with each of the configuration elements; e.g., a sensor detecting the position of a particular flap or spoiler. A dysfunctional element may flash, change colors or both. The indication of malfunction indicated by a flashing child group or sub-indicator may be accompanied by audio alerts. In the case of total engine failure, or failure of the engines to reverse thrust, one or more of the sub-indicators within the reverse thruster (engine) group may blink or display force lines within the symbol to indicate a malfunction. While the display settings can be set to only display particular groups in the case of malfunction, or simply display each sub-indicator when deployed, preferably the display settings would be reduced to a standard and codified.

Child groupings and the sub-indicators thereof can be distinguished individually by color or intensity or pulse rate.

The present invention may be a part of a Heads Up Display (HUD).

The foregoing description is not intended to limit the scope of the invention to the particular embodiments set forth, but on the contrary, it is intended to cover such alternatives, modifications, and equivalents as may be included within the spirit and scope of the description in view of the appended drawings and claims.

What is claimed is:

1. An Attitude and Configuration Indicator display system for a piloted craft comprising:
    an attitude indicator display; and,
    a two-dimensional parent icon within the bounds of the attitude indicator display and having defined borders, the parent icon being representative of the piloted craft in which the parent icon's position indicates at least the pitch and the roll of the piloted craft; and,
    a plurality of child symbol groups proximate to and within the borders of the parent icon, each representative of a category of elements associated with the configuration of the piloted craft and each child symbol group distinguishable from any other child symbol group by at least its characteristics of position and shape relative to the parent icon, in which the plurality of child symbol groups belong to the parent icon and move in concert therewith, and wherein each of the child symbol groups when displayed, is fully visible within the same plane as any other child symbol group regardless of the indicated pitch and roll.

2. The Attitude and Configuration Indicator display according to claim 1 in which the plurality of child symbol groups are displayed and hidden in response to real time data from sensors on the piloted craft.

3. The Attitude and Configuration Indicator display according to claim 1 in which the plurality of child symbol groups have at least two sub-indicators as members, each sub-indicator indicating the status of a particular configuration element.

4. The Attitude and Configuration Indicator display according to claim 1 in which at least one of the plurality of child symbol groups is within the borders of the parent icon.

5. A method of displaying configuration and attitude data for a piloted craft within an electronic instrument display system, comprising the steps of:
    displaying a parent icon representative of a piloted craft in which the position of the parent icon indicates at least the pitch and the roll of the piloted craft; and,
    selectively displaying or hiding a plurality of child symbol groups proximate to and within the borders of the parent icon, each group indicating the instant status of a particular element type associated with the piloted craft's configuration, wherein each child symbol group possesses at least two sub-indicators, and each sub-indicator represents a particular configuration element associated with the piloted craft, and in which any displayed child symbol group moves in concert with the parent icon, and remains fully visible within the same plane as any other displayed child symbol group regardless of the indicated pitch and roll.

6. The method according to claim 5 in which the element types represented include the lift inducing elements and drag inducing elements of a piloted craft.

7. In combination with an electronic instrument display system, an attitude indicator display for a piloted craft comprising:
- a parent icon having defined borders, the parent icon representative of the piloted craft in which the parent icon's position indicates at least the pitch and the roll of the piloted craft; and,
- a plurality of child symbol groups proximate to and within said borders; each group representative of a particular category of element associated with the configuration status of the piloted craft and each child symbol group being distinguishable from the other groups by at least its attributes of position and shape and in which the plurality of child symbol groups are integrated with the parent icon moving in concert therewith, and in which at least one child symbol group possesses at least one sub-indicator that indicates an operational aspect of a configuration element of the piloted craft, and wherein any one child symbol group is viewable on a same plane as any other child symbol group regardless of the indicated pitch and roll.

8. The attitude indicator according to claim 7 in which the categories of elements represented by the child symbol groups include the lift inducing elements and drag inducing elements of the piloted craft.

* * * * *